United States Patent
Edge et al.

[15] 3,665,138
[45] May 23, 1972

[54] ANTI-ARC INDUCTION HEATING TOOL

[72] Inventors: Andrew F. Edge, Long Beach; Masashi Hayase, Fountain Valley, both of Calif.

[73] Assignee: McDonnell Douglas Corporation

[22] Filed: Feb. 22, 1971

[21] Appl. No.: 117,267

[52] U.S. Cl..................219/8.5, 219/10.75, 219/10.79
[51] Int. Cl.....................................B23k 13/02
[58] Field of Search............219/8.5, 9.5, 10.79, 10.75, 219/10.57, 10.69, 10.71

[56] References Cited

UNITED STATES PATENTS

| | | |
|---|---|---|
| 3,428,769 | 2/1969 | Ciszewski et al..................219/9.5 |
| 2,889,438 | 6/1959 | McDanels et al..................219/10.79 |
| 3,219,786 | 11/1965 | Wenzel..................219/8.5 |
| 3,518,394 | 6/1970 | Dawson..................219/10.75 |
| 2,479,341 | 8/1949 | Gehr et al..................219/10.79 |

*Primary Examiner*—J. V. Truhe
*Assistant Examiner*—B. A. Reynolds
*Attorney*—Walter J. Jason, Donald L. Royer and George W. Finch

[57] ABSTRACT

An induction heating tool for welding or brazing tubes and their associated couplings and connectors wherein a split single turn inductor forms a heating chamber when the jaws thereof are closed and locked. When the jaws are opened or in otherwise poor electrical contact the contact surfaces thereof are maintained in electrical communication to prevent arcing thereacross.

8 Claims, 2 Drawing Figures

Patented May 23, 1972

3,665,138

INVENTORS
ANDREW F. EDGE
MASASHI HAYASE

BY George W. Finch
— ATTORNEY —

ANTI-ARC INDUCTION HEATING TOOL

CROSS-REFERENCE TO RELATED PATENT

This application relates to the subject matter of U.S. Pat. No. 3,428,796, entitled INDUCTION HEATING TOOL, which issued Feb. 18, 1969 and reference is made to the information therein as though fully set forth hereinbelow.

BACKGROUND OF THE INVENTION

The welding, brazing or soldering of joints and interconnections between tubes and their associated couplings has obvious advantages over the use of threaded connections particularly when the joint must be made fluid tight and be permanent in nature. One such method is that of brazing with induction heating of the joint until a filler material melts and forms a bond with a base metal and thus integrally connecting the tubes with their associated connections. Induction heating is done by passing an alternating electric current through a coil. The workpiece is placed within the coil and the eddy currents produced in the workpiece by the changing field causes the workpiece to become heated. High currents and frequencies within the coil are required in most instances to produce fields strong enough to heat the workpiece adequately and these high currents and frequencies are extremely dangerous if the jaws of the tool are opened accidentally or the contact surfaces thereof make poor electrical contact while current is passing therethrough. This is because the current tends to flow across the gap or high impedance in the form of an arc which destroys the contact surfaces of the tool and in some instances, the workpiece.

SUMMARY OF THE INVENTION

In accordance with the present invention there is provided an induction heating tool in which an induction coil is closely coupled around the workpiece so that the heating is concentrated in the area of the joint to be brazed. A multi-purpose clamp and chill block holds the workpiece firmly and accurately within the induction coil for uniform heating and at the same time, conducts heat away from the workpiece to prevent or limit the annealing of heat treated or work hardened workpieces so that the heat effected zone is limited mainly to that portion of the workpiece inserted into and reinforced by the clamp. The mating contact ends of the induction coil are always electrically connected to each other and normally grounded in the present invention, the usual method being connecting them to opposite sides of the multi-purpose clamp and chill block which, in turn, is grounded. Therefore, in the preferred embodiment, the multi-purpose chill and clamping block not only grounds the clamped workpiece but it also assures electrical continuity across the mating jaws of the induction coil to eliminate the possibility of poor or nonexistant electrical contact therebetween and the resultant, destructive arcing.

It is therefore an object of the present invention to provide means which eliminate arcing across the jaws of a pliers type single coil induction tool.

This and other objects and advantages of the present invention will become apparent after considering the following detailed specification which covers a preferred embodiment thereof in conjunction with the accompanying drawing wherein:

DESCRIPTION OF THE SHOWN EMBODIMENT

Figure 1:
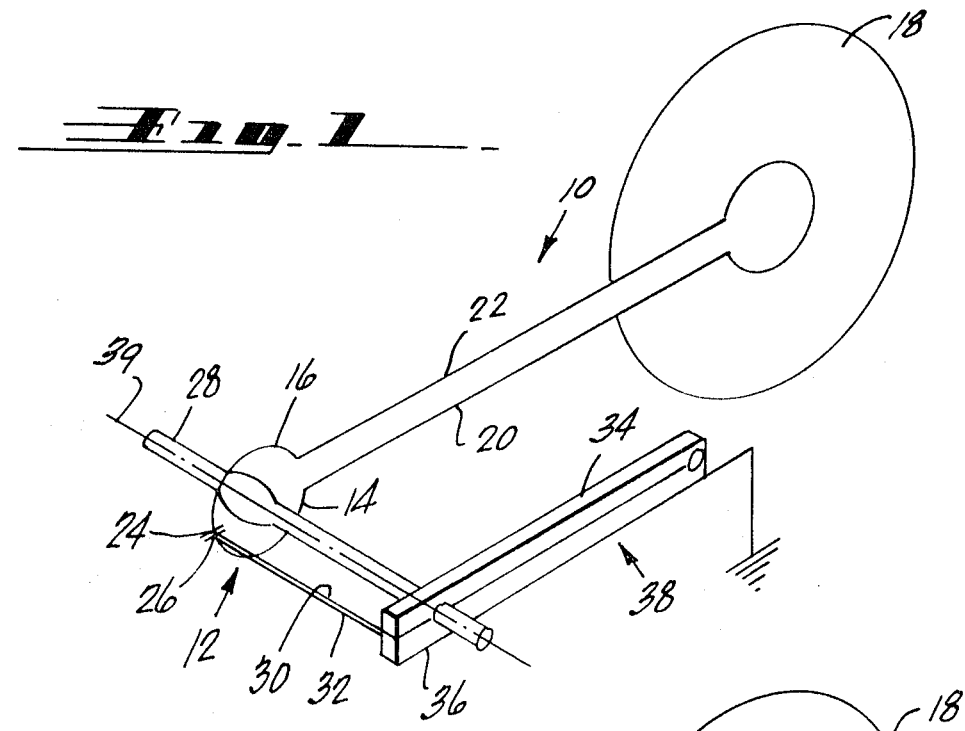
FIG. 1 is a diagrammatic view of a single coil induction heating tool employing the present invention wherein the tool is in a closed condition.
Figure 2:
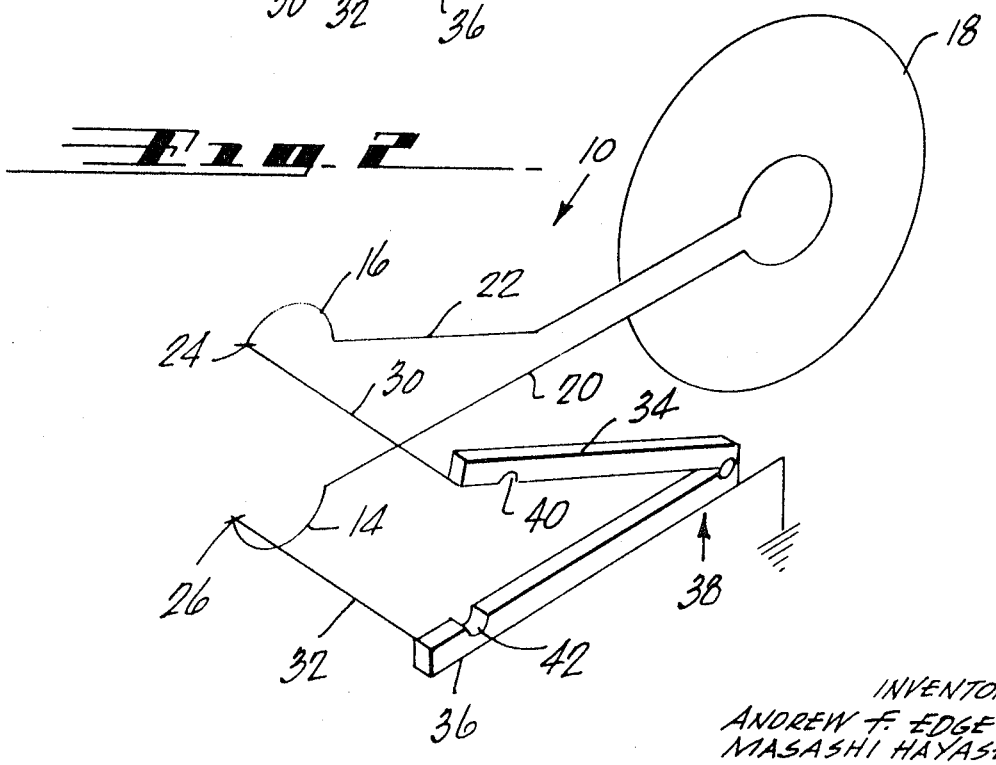
FIG. 2 is a diagrammatic view similar to FIG. 1 with the induction tool open or with less than full electrical communication across the jaw contacts thereof.

Referring to the drawing more particularly by reference numbers, number 10 refers to an induction heating tool including a single turn split induction coil 12 having a lower coil half 14 and an upper coil half 16 pivotally mounted relative to the lower coil half 14 for movement between the closed position, shown in FIG. 1, and the open position shown in FIG. 2. Electrical RF power is connected to the lower and upper coil halves 14 and 16 from an RF source 18 by means of conductors 20 and 22, respectively. When the coil 12 is in the closed position, shown in FIG. 1, the RF electrical energy travels along the conductors 20 and 22, the coil halves 14 and 16 and the contact surfaces 24 and 26 therebetween to produce eddy currents in the workpiece 28 positioned within the coil 12. The electrical contact between the lower coil half 14 and the upper coil half 16 at the contact surfaces 24 and 26 is critical, however, since less than full electrical contact can cause arching across the contacts 24 and 26 which arcing tends to destroy them.

Conductors 30 and 32 are therefore connected to the split coil contact surfaces 24 and 26 respectively. The conductors 30 and 32 are connected to each other by any suitable means such as by connecting them to opposite electrically common sides 34 and 36 of a combined clamp and chill block 38 which is normally grounded as shown. It is also preferably for the conductors 30 and 32 to extend outward parallel to the axis 39 of the coil 12, so that any field which is unexpectedly generated therebetween is at right angles to the coil field so the fields do not interact. The sides 34 and 36 of the block 38 are pivotally connected to open and close in conjunction with the split coil 12 so that the workpiece 28 can be easily inserted therebetween in indentations 40 and 42 in the sides 34 and 36, respectively. The indentations 40 and 42 are adapted to clamp the workpiece 28 and to provide a path for heat therefrom so that the heat generated by means of the split coil 12 is restrained within a predetermined portion of the workpiece 28.

When the split coil 12 is closed about a workpiece 28 for operation, the connections 30 and 32 act as a single ground lead since they are effectively connected to the same portion of the coil 12 and therefore they do not interfere with the heating characteristics of the single turn, split induction coil 12. Since the conductors 30 and 32, whether grounded or not, complete the induction coil circuit continuously even when the split induction coil 12 is open or partially open, the result of the circuit formed by the conductors 30 and 32 and the block 38 is to eliminate the split of the induction coil 12 without adversely effecting its characteristics while eliminating the possibility of damaging arcing at the contact surfaces 24 and 26. It should be apparent that the present invention of employing means to always maintain the contact surfaces 24 and 26 of the induction coil 12 electrically common is applicable to any single turn split inductor, whether a block 38 is incorporated therewith or not.

Thus, there has been shown and described a novel induction tool employing anti-arc means which fulfills all of the objects and advantages sought therefore. Many changes, modifications, variations, and other uses and applications of the subject induction tool will, however, become apparent to those skilled in the art after considering this specification together with the accompanying drawing. All such changes, modifications, variations, and other uses and applications which do not depart from the spirit and scope of the present invention are deemed to be covered by the invention which is limited only by the claims which follows:

What is claimed is:

1. In an induction heating tool including a first generally semicircular jaw, and a second generally semicircular jaw, said semicircular jaws having first and second ends, said first end of said second jaw being pivotally mounted relative to said first end of said first jaw for movement between positions wherein said second ends of said jaws are opened and closed, said first ends of said jaws being insulated from each other and being connected to a source of alternating current, said jaws forming a splitable single coil inductor heating chamber within which a workpiece can be positioned for heating by opening said second ends of said jaws, said jaws each including contact surfaces on said second ends adapted for abutment with each other to establish electrical contact therebetween, the improvement comprising:

means for continuously, electrically communicating said jaw contact surfaces so that a substantial electric potential can never appear thereacross to cause arcing.

2. The induction heating tool defined in claim 1 wherein said tool includes:

cooling and clamping means for retaining the workpiece within said heating chamber and for restricting the flow of heat generated thereby to a predetermined portion of the workpiece, said cooling and clamping means being grounded and including a first clamp portion adapted to move with said first jaw and a second clamp portion adapted to move with said second jaw, said first and second clamp portions being pivoted to each other and in continuous electrical contact; and said means for electrically communicating said contacts of said induction coil jaws including a first conductor connected between said first jaw contact surface and said first clamp portion, and a second conductor connected between said second jaw contact surface and said second clamp portion, whereby said cooling and clamping means electrically communicate and ground said contact surfaces.

3. A single turn, splitable induction coil including:

a first coil portion having a contact surface at one end thereof;

a second coil portion having a contact surface at one end thereof adapted to abut and make electrical contact with said first coil portion contact surface;

pivotal means connecting said first and second coil portions so said contact surfaces can be opened to insert a workpiece in said coil; and means connected to said contact surfaces to assure a predetermined electrical potential can not develop therebetween.

4. The coil defined in claim 3 wherein said means connected to said contact surfaces include a ground connection to ground said contact surfaces.

5. The coil defined in claim 3 wherein said coil includes means to retain and ground the workpiece inserted therein, said means connected to said contact surfaces being comprised of:

a first conductor connected between said first coil portion contact surface and said workpiece retention and grounding means; and a second conductor connected between said second coil portion contact surface and said workpiece retention and grounding means.

6. The coil defined in claim 8 wherein said first and second conductors extend away from said contact surfaces parallel to the axis of said coil.

7. In an induction heating tool including a first jaw, a second jaw pivotally mounted relative to said first jaw for movement between open and closed positions, said jaws forming a split inductor heating chamber within which a workpiece can be positioned for heating, said jaws each including outer contact surfaces adapted for abutment with each other to establish electrical contact therebetween, and cooling and clamping means for retaining the workpiece within said heating chamber and for restricting the flow of heat generated thereby to a predetermined portion of the workpiece, said cooling and clamping means being grounded and including a first clamp portion adapted to move with said first jaw and a second clamp portion adapted to move with said second jaw, said first and second clamp portions being pivoted to each other and in continuous electrical contact, the improvement comprising:

means for continuously, electrically communicating said jaw contact surfaces so that a substantial electric potential can never appear thereacross to cause arcing, said means for continuously, electrically communicating said jaw contact surfaces including a first conductor connected between said first jaw contact surface and said first clamp portion, and a second conductor connected between said second jaw contact surface and said second clamp portion, whereby said cooling and clamping means electrically communicate and ground said contact surfaces.

8. A single turn, split induction coil including:

a first coil portion having a contact surface at one end thereof;

a second coil portion having a contact surface at one end thereof adapted to abut and make electrical contact with said first coil portion contact surface;

pivotal means connecting said first and second coil portions so they can be opened to insert a workpiece therebetween;

means to retain and ground the workpiece inserted in said coil; and means connected between said contact surfaces to assure electrical communication therebetween, said electrical communication assuring means being comprised of a first conductor connected between said first coil portion contact surface and said workpiece retention and grounding means, and a second conductor connected between said second coil portion contact surface and said workpiece retention and grounding means.

* * * * *